(12) United States Patent
Kubo et al.

(10) Patent No.: US 7,666,487 B2
(45) Date of Patent: Feb. 23, 2010

(54) EASY-OPEN END AND LAMINATED STEEL SHEET

(75) Inventors: Hiroshi Kubo, Fukuyama (JP); Katsumi Kojima, Fukuyama (JP); Hiroki Iwasa, Fukuyama (JP)

(73) Assignee: JFE Steel Corporation, Tokyo (JP)

( * ) Notice: Subject to any disclaimer, the term of this patent is extended or adjusted under 35 U.S.C. 154(b) by 201 days.

(21) Appl. No.: 10/550,795

(22) PCT Filed: May 21, 2004

(86) PCT No.: PCT/JP2004/007318

§ 371 (c)(1),
(2), (4) Date: Jun. 6, 2006

(87) PCT Pub. No.: WO2004/103836

PCT Pub. Date: Dec. 2, 2004

(65) Prior Publication Data

US 2006/0228524 A1 Oct. 12, 2006

(30) Foreign Application Priority Data

May 22, 2003 (JP) ............................. 2003-144985
May 22, 2003 (JP) ............................. 2003-144986

(51) Int. Cl.
| | |
|---|---|
| *B32B 27/36* | (2006.01) |
| *B65B 7/28* | (2006.01) |
| *B65D 35/44* | (2006.01) |
| *B65D 55/00* | (2006.01) |
| *B65D 25/28* | (2006.01) |

(52) U.S. Cl. .................... 428/43; 220/200; 220/260; 220/268; 220/269; 428/216; 428/221; 428/332; 428/458; 428/480

(58) Field of Classification Search ................. 428/23, 428/43, 216, 221, 332, 458, 480; 220/200, 220/260, 268, 269
See application file for complete search history.

(56) References Cited

U.S. PATENT DOCUMENTS 5,900,325 A * 5/1999 Okamura et al. ............ 428/623

FOREIGN PATENT DOCUMENTS

| EP | 1 046 589 | 10/2000 |
|---|---|---|
| JP | 6-192401 | 7/1994 |
| JP | 9-300567 | 11/1997 |
| JP | 9-309146 | 12/1997 |

(Continued)

OTHER PUBLICATIONS

Translation of JP 2000158588 A (Iwasa et al.), see above.*

(Continued)

*Primary Examiner*—Brent T O'Hern
(74) *Attorney, Agent, or Firm*—Young & Thompson

(57) ABSTRACT

An easy-open end which comprises a steel sheet and formed on at least one side thereof an about 10-30 mum-thick coating film of a polyester resin having a 50% crystallization time of about 5 minutes or shorter and a coefficient of planar orientation of about 0.04 or lower and which has a groove for cutting which has a cross section having a radius of curvature of about 0.1 to 1 mm; and a laminated steel sheet for use in the easy-open end. This easy-open end can combine suitability for opening and no need of repair even when the residual score thickness is small.

3 Claims, 1 Drawing Sheet

(a)

(b)

FOREIGN PATENT DOCUMENTS

| | | | |
|---|---|---|---|
| JP | 2000158588 A | * | 6/2000 |
| JP | 2000-318734 | | 11/2000 |
| JP | 2000318734 A | * | 11/2000 |
| JP | 2001-010111 | | 2/2001 |
| JP | 2002-120268 | | 4/2002 |
| JP | 2002-179061 | | 6/2002 |
| JP | 2002-356568 | | 12/2002 |

OTHER PUBLICATIONS

Translation of JP 2000318734 A (Yamanaka et al.), see above.*
European Patent Office issued a Supplementary European Search Report dated Apr. 23, 2009, Application No. 04 73 4402.

* cited by examiner (a)

(b)

EASY-OPEN END AND LAMINATED STEEL SHEET

TECHNICAL FIELD

The present invention relates to a steel-made easy open end which allows a lid of metallic container, particularly a part or almost whole area of a can lid, to be easily opened by a finger, and relates to a laminated steel sheet therefor.

BACKGROUND ART

An easy open end is a lid which can easily be opened by a finger without using a jig such as can opener. The material of easy open end mainly adopts aluminum. Aluminum-made easy open end fully occupies the market of beverage cans and food cans. The quantity of aluminum-made easy open end has further increased accompanied with the increasing tendency of adoption of easy open end. The phenomenon suggests that the market does not evaluate the merit of switching the aluminum-made easy open end to the one made by laminated steel sheet.

The steel-made easy open end can be manufactured in a similar manner with the aluminum-made one. That is, a base metal sheet is coated by a resin film for food protection, rust prevention, and other purposes, followed by forming a groove or a carved line, (hereinafter referred to also as score), using a press to allow a finger to easily tear-off the score portion. In the pressing step, however, the resin film is broken to expose-metal in a portion of the lid. Rust is generated at the exposed section with lapse of time for both aluminum-made lid and steel-made lid. On the steel-made lid, however, rust becomes further noticeable, and the product value of the steel-made lid further deteriorates than that of the aluminum-made lid. Accordingly, the steel-made easy open end is subjected to repair by lacquering after the pressing step. The lacquered steel sheet itself is inexpensive as the base material. Since, however, a repair lacquering step is required after score-forming on the lid, economic load becomes heavy. Owing to these reasons, steel sheets are not positively used.

With the background, various trials for eliminating the repair lacquering on the steel-made easy open end have been conducted through the investigations of method for forming score on lid and through the adoption of laminated steel sheet responding to the forming method.

Unexamined Japanese Patent Publication No. 06-115546 tries to eliminate repair lacquering by using a polyester resin and by improving the conventional method for forming V-shape score. Unexamined Japanese Patent Publication No. 09-234534 improves the score-forming method while specifying the thickness and the breaking elongation or resin layer. Unexamined Japanese Patent Publication No. 11-91775 tries to eliminate repair lacquering using a curved surface die for score forming.

However, even in those repair-free technologies for steel-made easy open end, there are cases of incapable of using steel-made easy open end depending on the required level of the contents filled in the can, the design of can and lid, the method for can manufacturing and lid manufacturing, the retorting condition, and the like. Consequently, these technologies are not at a satisfactory level.

In concrete terms, (1) reduction in the score residual thickness by a certain score-forming method results in likely breaking of film, though the openeability (also called the can openeability) improves, thus the elimination of repair lacquering becomes difficult, (2) blushing phenomenon on film occurs during retorting, which is a problems specific to laminate film, and other problems arise. The term "retorting" referred to herein means the heat treatment of a can with packed contents using high temperature steam or the like to thermally sterilize the contents.

Therefore, the market wants a technology that solves these problems. Once attaining the technology, full scale market introduction of the inexpensive laminated steel sheet becomes possible. Furthermore, the significance of the technology does not stay at the reduction in can cost. The substitution of steel for aluminum gives a significant impact also to industries because the all-steel can is superior in the recycle viewpoint and because the steel itself is a base material giving light environmental load compared with aluminum.

An object of the present invention is to solve the above problems and to provide a steel-made easy open end which achieves both openeability and elimination of repair lacquering even with a thin score residual thickness, and to provide a laminated steel sheet as the material therefor. The prevent invention also provides a steel-made easy open end which has excellent blushing resistance during retorting, adding to both of the above performance, and provides a laminated steel sheet suitable as the material therefor.

DISCLOSURE OF THE INVENTION

The present invention provides an easy open end comprising a polyester resin film having about 5 minutes or shorter half crystallization time and about 0.04 or smaller plane orientation coefficient at thicknesses from about 10 to about 30 μm on at least one side of a steel sheet, wherein the easy open end is provided with a tear-off groove having a cross sectional shape with curvatures from about 0.1 to about 1 mm.

Regarding the easy open end, the polyester resin is preferably a polymer of ethylene glycol with at least one dicarboxylic acid selected from the group consisting of terephthalic acid and isophthalic acid, and/or a polymer of terephthalic acid with at least one glycol selected from the group consisting of ethylene glycol and butylene glycol. Furthermore, for the easy open end as any one of given above, the polyester resin is more preferably a copolyester.

For the easy open end in any one of above, the polyester resin is preferably a mixture of polyethylene terephthalate and polybutylene terephthalate.

For the easy open end as in any one of above, the polyester resin is preferably a copolyester in which about 94 to about 98% by mole of polybasic acid components is a terephthaloyl component.

For the easy open end as in any one of above, the polyester resin is preferably a copolyester of terephthalic acid, isophthalic acid, and ethylene glycol.

The present invention also provides a laminated steel sheet for easy open end which satisfies the requirements of any one of the above easy open ends.

That is, the present invention provides a laminated steel sheet comprising a resin coating layer on each side of a steel sheet, being used for a lid requiring no can opener, (an easy open end), having a tear-off groove thereon formed by press-forming using a curved surface die to give a groove cross sectional shape with curvatures from 0.1 to 1.0 mm, which resin coating layer comprising a polyester resin having 5 minutes or shorter half crystallization time, 0.04 or smaller plane orientation coefficient, and 10 to 30 μm of thickness.

Furthermore, the present invention provides a laminated steel sheet comprising a resin coating layer on each side of a steel sheet, being used for a lid requiring no can opener, having a tear-off groove thereon formed by press-forming using a curved surface die to give a groove cross sectional shape with curvatures from 0.1 to 1.0 mm, which resin coating layer is a copolyester resin comprising a dicarboxylic acid component and a glycol component, the dicarboxylic acid components contain terephthalic acid from 94% or more to less than 98% by mole, and the copolyester resin has 0.04 or smaller plane orientation coefficient and 10 to 30 μm of thickness.

BRIEF DESCRIPTION OF THE DRAWING

FIG. 1(a) shows an example of tear-off groove formed on one side of the laminated steel sheet, and FIG. 1(b) shows an example of tear-off groove formed on each side of the laminated steel sheet.

BEST MODE FOR CARRYING OUT THE INVENTION

An investigation given by the inventors of the present invention revealed that the residual thickness of the tear-off groove governs the openeability of easy open end. Thinner score residual thickness further improves the openeability. On the other hand, thinning the score residual thickness means the increase in the degree of score forming. For a laminated steel sheet, increase in the degree of score forming makes the film likely be damaged, thus increases in difficulty to assure the corrosion resistance, which needs repair lacquering. Consequently, to assure both the elimination of repair lacquering and the openeability means to assure that the film is not damaged even when the score residual thickness is decreased. The term "laminate" designates to prepare a plywood in a wide sense, or to overlay resin films, aluminum foils, papers, or the like to attach them together. Specifically in the present invention, the term "laminate" means to cover the steel sheet by a resin film on at least one side thereof.

The article of background art described that various methods for forming score were tried and that films responding to these methods were proposed.

Figure 1:
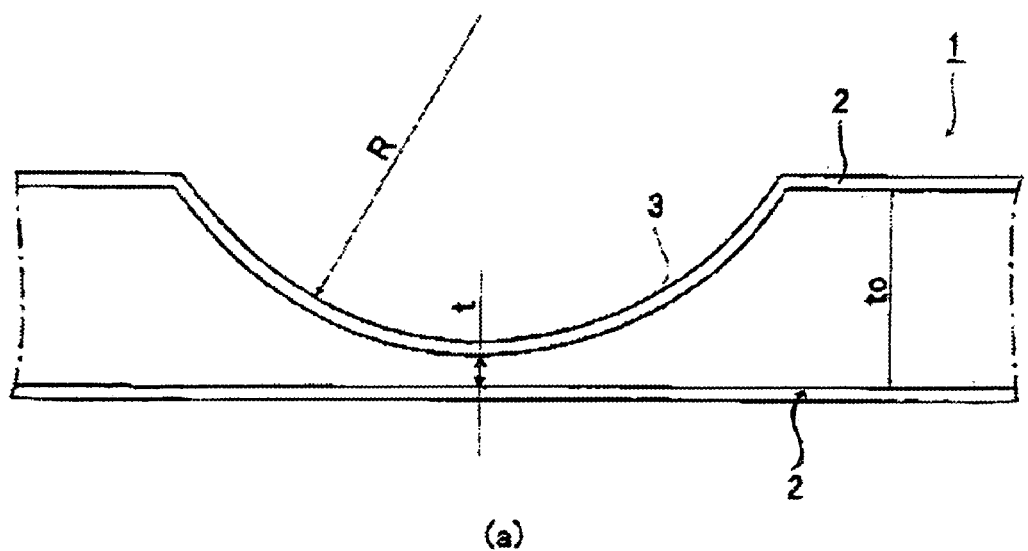
FIG. 1 shows a cross sectional view of the tear-off groove portion on an easy open end formed by pressing using a curved surface die.
Figure 1:
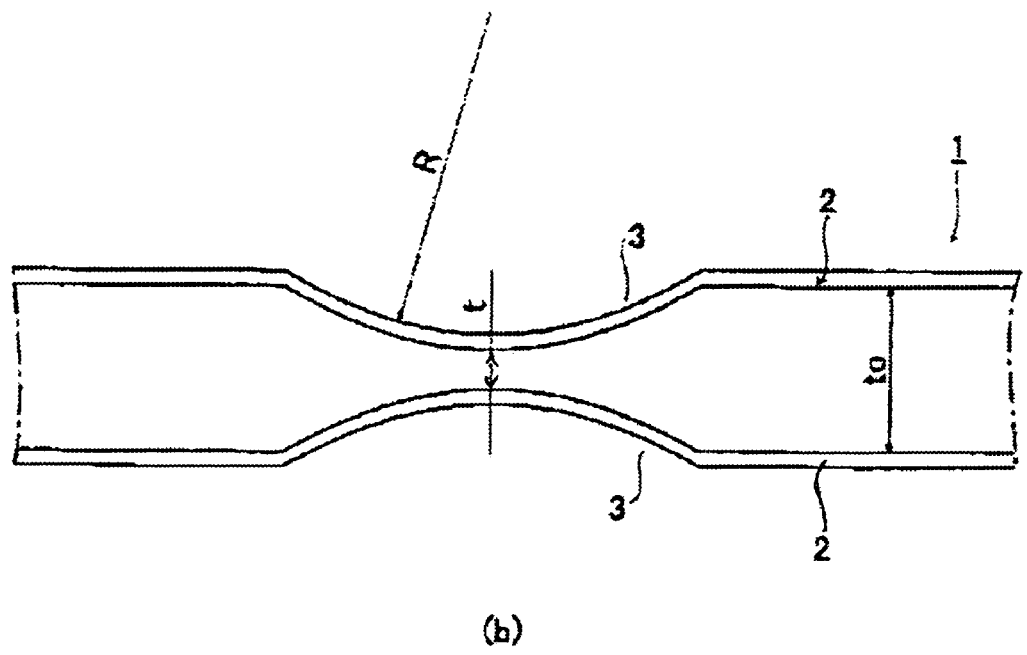

The inventors of the present invention investigated the score-forming method, particularly the press-forming method using a curved surface die to form a tear-off groove having a cross section of curved surface, and found that the damages of resin film are remarkably reduced even at a thin score residual thickness by specifying the radius of curvature (R) of the cross section of tear-off groove formed on at least one of the front face and the back face of the can lid to a range from 0.1 to 1 mm, as shown in FIG. 1(a) and FIG. 1(b), (for example, Unexamined Japanese Patent Publication No. 11-91775). For other reference symbols in FIG. 1, 1 denotes the laminated steel sheet (after score forming), 2 denotes the laminated resin layer (both-side type), 3 denotes the tear-off groove (score), t denotes the score residual thickness, and to denotes the sole metal-sheet thickness.

The inventors of the present invention investigated various films having excellent effect to prevent films damages in the press-forming using the curved surface die, and perfected the present invention.

That is, the present invention provides an easy open end comprising a polyester resin film having about 5 minutes or shorter half crystallization time and about 0.04 or smaller plane orientation coefficient at thicknesses from about 10 to about 30 μm on at least one side of a steel sheet, wherein the easy open end is provided with a tear-off groove having a cross sectional shape with curvatures from about 0.1 to about 1 mm, and provides a laminated steel sheet therefor.

The present invention specifies the lower limit of the radius of curvature (R) of the tear-off groove to 0.1 mm because excessively small radius of curvature increases the shearing force applied to the film. The upper limit of the radius of curvature is specified to about 1 mm because larger than that upper limit increases the forming volume. That is, the forming forces the material corresponding to the score volume to flow-out to the surrounding area, which extends the film particularly at opposite side to the score. For the case of both-side score forming, the extension is required to occur on both sides of the score. As a result, the film extension increases, thus the film tends to easily break. Increase in the force necessary for forming score is also unfavorable. An excess radius of curvature leads to an excess width of score, which is unfavorable also in design point of view. More preferably, the radius of curvature is from about 0.25 to about 0.5 mm. At 0.25 mm or larger radius of curvature, the shearing force becomes weak. If the radius of curvature is 0.5 mm or smaller, the forming volume is sufficiently small so that the extension of film is also kept sufficiently small.

The minimum score residual thickness may be arbitrarily determined depending on the can lid design and other conditions. Decreased minimum score residual thickness gives better openeability (can openeability). On the other hand, decreased score residual thickness likely induces break of film at the score portion by impact of dropping or the like. With the same minimum score residual thickness, the opening force varies depending on the lid design. With the principle of leverage, the design of long tab tends to decrease the opening force. Higher rigidity of the lid tends to give smaller opening force. From these viewpoints, generally the minimum score residual thickness is preferably from 30 to 90 μm, and more preferably from 40 to 70 μm.

For the forming method, the inventors of the present invention found that a suitable film material is a polyester resin, specifically a polyester resin having a small plane orientation coefficient and a high crystallization rate. The detail mechanism of the above finding is not fully analyzed. For the forming by press-forming using a curved surface die, however, favorable formability is attained presumably from small plane orientation coefficient which leads to easy extension in the initial stage of forming and from high crystallization rate which leads to easy arrangement of crystals during forming. The term "plane orientation coefficient" referred to herein is defined as the value subtracting the refractive index in the film thickness direction from the refractive index in the film stretching direction. The value is understood to express the anisotropy in the stretching direction of crystals which are formed by stretching. The refractive index can be determined by an ordinary Abbe's refractometer.

Although high extensibility of film is a necessary condition of high formability, sole high extensibility does not lead to high formability. For example, an olefin which has superior extensibility has a tendency of break of film in the initial stage of score forming. The phenomenon presumably comes from insufficient breaking strength. That is, by the score forming, not only the film is extended by the pressing force but also shearing force is applied to the film on the side contacting with the die. If the front end of the die is in a sharp V-shape, it is readily expected that the shearing force becomes predominant during score forming. The present invention adopts the die with a curved surface to weaken the shearing force. Even with a curved surface, however, the press-forming using a die is a forming in the vertical direction to the film plane so that large shearing force is expected to be applied. Accordingly, for an olefin which has poor breaking strength, though it has excellent extensibility, the film thereof is broken by the shearing force in the initial stage of forming. For the score forming, the balance of extensibility and breaking strength should be emphasized.

Generally, however, resins having high extensibility are poor in strength, and resins having high strength are poor in extensibility. That is, these two characteristics are mutually contradictory. The inventors of the present invention found that, for the pressing score forming using a curved surface die, polyester resins give the highest balance of the above two characteristics. Furthermore, the inventors found that polyester resins with small plane orientation coefficient give particularly favorable balance there between. Consequently, the plane orientation coefficient is specified to about 0.04 or smaller.

There is no specific limitation to attain a steel sheet laminated by a polyester film having about 0.04 or smaller plane orientation coefficient. An example of the method to prepare that type of steel sheet is the one which forms a polyester film having about 0.04 or smaller plane orientation coefficient on the steel sheet by pasting, adhering, heat lamination, or the like. An other applicable method is the direct-laminating method in which resin chips are melted and are directly extruded onto the steel sheet without stretching. Further example method is the one which forms a polyester film having larger than about 0.04 of plane orientation coefficient on the steel sheet while adjusting the plane orientation coefficient to about 0.04 or smaller under thermal fusion.

In addition, the inventors of the present invention found that the resins having higher crystallization rate give superior formability in the press-forming using a curved surface die. Although the mechanism of the tendency is not fully analyzed, a presumable contributing phenomenon is that resins generally decrease in their volume when they are crystallized. A resin which is compressed in the vertical direction by the die extends to the horizontal direction accompanying with the volume reduction owing to the crystallization. At that moment, larger volume reduction is expected to allow smoother deformation. Since, in any case, a resin which has crystallization rate giving about 5 minutes or shorter half crystallization time showed better formability, the present invention specifies the half crystallization time to about 5 minutes or shorter. The half crystallization time is preferably about 3 minutes or shorter, and it was confirmed that the range gives specifically favorable score formability. Furthermore, it should be noted that about 1 minute or shorter half crystallization time drastically improves the resistance to blushing during retorting, as described later.

When a polymer melt which is held to above the melting point thereof is rapidly transferred to a certain constant temperature below the melting point, the volume of the polymer decreases (increasing in density) with the progress of crystallization, resulting in a constant volume (density) after a certain time. The half crystallization time is defined as the time for the volume reduction to reach just half the total reduction in volume. In other words, when the volume becomes a constant value after a certain time is defined as $V_\infty$, and when the volume right after the transference to the constant temperature is defined as $V_0$, the time necessary for the volume to reach $(V_0-V_\infty)/2$ is the half crystallization time.

Herein the half crystallization time is mainly determined by the resin before coating on the steel sheet. Accordingly, a film having about 5 minutes or shorter half crystallization time is adequately selected, and the film is laminated or adhered to the steel sheet to obtain the wanted laminated steel sheet.

The laminated steel sheet according to the present invention can be manufactured by forming a coating layer of polyester resin to be applicable to the present invention on at least one side of each of the various types of surface treated steel sheets as the base material using adhesion, lamination, and other method. Preferred surface treated steel sheets include a steel sheet coated by one or more of tin, zinc, nickel, chromium, or an alloy thereof, and one of above steel sheets further subjected to various chemical conversion treatments such as chromate treatment and phosphate treatment onto the plating.

According to the present invention, the thickness of polyester resin film is specified to a range from about 10 to about 30 μm because smaller than 10 μm increases the film-forming cost and because over 30 μm saturates the effect of resin layer thickness to reduce the cost merit. The film thickness may adequately be selected within the specified range responding to the required performance.

The polyester resin according to the present invention is preferably a saturated polyester resin, and more preferably a linear thermoplastic polyester film.

Examples of the polyester resin are a polymer of ethylene glycol with at least one dicarboxylic acid, as the polybasic acid, selected from the group consisting of terephthalic acid and isophthalic acid, and a polymer of terephthalic acid with at least one glycol, as the polyalcohol, selected from the group consisting of ethylene glycol and butylene glycol. These polymers may be a homopolymer or a copolymer. As of these, polyethylene terephthalate and a copolyethylene terephthalate are preferred because of favorable balance between extension and strength. The above polyester resins may be used in a mixture thereof. Specifically a resin of mixture of polyethylene terephthalate and polybutylene terephthalate is preferred because it gives favorable balance between extension and strength, and gives high crystallization rate. Although that type of ester resin mixture may induce ester interchange reaction, the present invention also includes such a ester interchanged resin in the scope. If the polyester resin is a polymer of terephthalic acid with at least one glycol selected from the group consisting of ethylene glycol and butylene glycol, it is also a preferred resin owing to favorable balance between extension and strength.

Furthermore, the inventors of the present invention developed an easy open end which is hard to generate film break even in the case of lid-forming after the heat treatment step such as baking finish and heat transfer printing, and developed a polyester resin laminated steel sheet used for the easy open end.

It is known that the baking step induces generation of crystals called the spherulite in the film, which crystals deteriorate the formability. Owing to the generation of spherulite, the score formability is deteriorated. The problem is, however, solved by selecting an adequate degree of copolymerization.

That is, for the above given case of polyester resin according to the present invention, it was found that a copolyester having terephthaloyl component as a structural component occupying about 94 to about 98% by mole of the polybasic acid components gives favorable formability. The effect to suppress the spherulite formation is enhanced by adjusting the percentage of the terephthaloyl component to about 98% by mole or smaller. If, however, the percentage of terephthaloyl component becomes excessively small, the crystallization rate decreases. Therefore, about 94% by mole or larger percentage of terephthaloyl component is preferred.

For the case of forming using a curved surface die, the resin layer is extended to become thin along with the penetration of die deep into the resin, and at the same time, the shearing stress component applied to the resin increases. Thinning in the resin layer decreases a durability against the shear, and when the durability becomes below the shearing stress, breakage of the resin layer occurs. Since, however, extensibility and the strength are contradict properties with each other, use of a high strength resin lacks the extensibility, which results in breakage. The dilemma is, however, solved by emphasizing the work-hardening characteristic of the resin film.

Reduction in the resin thickness by forming decreases the strength, which induces the tendency of easily breaking the resin by shearing force. On the other hand, a resin which is subjected to forming tends to increase the strength owing to the work-hardening. Accordingly, a resin which shows large degree of work-hardening is hard to induce reduction in strength even after extended, thus expecting to give favorable formability. For a polyester, since the extensibility depends on the plane orientation coefficient, the one which has smaller plane orientation coefficient is more preferred. From these view points, the present invention specifies the plane orientation coefficient to 0.04 or smaller. The hardenability by forming becomes larger when the component percentage of copolymer resin becomes closer to the homopolymer. Therefore, the above described lower limit of the percentage of terephthaloyl component in the polybasic acid component structuring the above copolyester, (about 94% or more), is specified considering the above findings.

The following is the description about the film-deterioration problem occurring when the lid-formation is applied after the coating step (heat treatment process). When a polyester resin is subjected to heat treatment, crystals called the spherulite grow to deteriorate the formability. Although the forming using a curved surface die, which is specified by the present invention, is a forming method which is relatively difficult to induce bad effect of spherulite, some degree of the effect unavoidably occurs. The formation of spherulite becomes significant for the polyester closer to a homopolymer. Consequently, the suppression of the bad effect is attained by controlling the degree of copolymerization. For the forming using a curved surface die, according to the present invention, the adopted polyester is a copolyester in which the percentage of the terephthaloyl component in the polybasic acid components structuring the copolyester to about 98% by mole or smaller. With the specification, it was found that the formation of spherulite is suppressed and that favorable formability is attained even after heat treatment. The term "heat treatment" referred herein means a treatment such as baking finish and heat transfer printing, and generally a treatment at temperatures from about 180° C. to about 230° C.

For that type of copolyester consisting mainly of terephthalic acid, the raw material polybasic acid other than terephthalic acid includes: aromatic dicarboxylic acids such as naphthalene dicarboxylic acids, diphenyl dicarboxylic acids, diphenyl sulfone dicarboxylic acids, diphenoxyethane dicarboxylic acids, 5-sodium sulfo-isophthalate, and phthalic acids; and aliphatic dicarboxylic acids such as oxalic acid, succinic acid, adipic acid, sebacic acid, dimeric acid, maleic acid, fumaric acid, and cyclohexane dicarboxilic acids. Furthermore, oxycarboxylic acids such as hydroxybenzoic acids, hydroxynaphtoic acids, and hydoxybiphenyl carboxylic acids are favorably applied. As of these, isophthalic acid is preferred owing to superior balance between extensibility and strength of the film.

Retorting is relatively often used on manufacturing cans. When, however, a laminated steel sheet is used for an easy open end, a phenomenon of blushing of film may occur, which becomes a problem. Although the detail mechanism of blushing is not fully analyzed, permeation of water vapor into film during retorting is the cause. Also the blushing is solved by using a resin having high crystallization rate. As described above, the inventors of the present invention found that a polyester resin having small plane orientation coefficient and high crystallization rate is preferable from the point of formability. Furthermore, the present invention adopts a copolyester, as the polyester resin, having low copolymerization degree of about 94 to about 98% by mole of terephthaloyl component in the polybasic acid components structuring the copolyester resin. It was also described that such a structure of the copolyester resin provides an easy open end having superior formability even after heat treatment. Also it was found that the defect of blushing occurred by retorting is simultaneously solved using a copolyester which is adjusted to a low level of copolymerization degree because of the further increase in crystallization rate. According to the laminated steel sheet of the present invention, ordinary retorting induces practically no problem of blushing. Under severer retorting, however, blushing may become a problem. For that case, a resin having 1 minute or shorter half crystallization time is preferred. Alternatively, addition of a pigment solves the problem. Since pigment not only brings the blushing inconspicuous but also reduces the permeability of water vapor and suppresses blushing itself, pigments of transparent or light color can be used. The adding amount of pigment is adequately selectable depending on the effect and the use unless the effect of the present invention is deteriorated.

The copolyester resin film according to the present invention may coat the surface of steel sheet via an adhesion layer or may coat the surface thereof without applying adhesion layer. Coating the surface of steel sheet without applying adhesion layer eliminates harmful substances such as epoxy phenol used in the adhesion layer, thus the advantages of polyethylene terephthalate superior in food sanitation are effectively utilized. According to the present invention, the copolyester resin film may further be coated by a resin film to improve the flavor property and other characteristics.

The easy open end and the laminated steel sheet therefor according to the present invention can be applied to any of pull-top tab can lid, stay-on tab can lid, and full-open can lid.

EXAMPLES

[Preparation of Samples]

As the metal sheet, a continuous cast slab of low carbon Al-killed steel was treated by hot rolling, descaling, cold rolling, annealing, and temper rolling, thereby preparing a cold-rolled steel strip having dimensions of 0.196 mm in thickness and 920 mm in width. The cold-rolled steel strip was degreased and pickled, and then treated by electrolytic chromating to apply plating of metallic chromium of 130 mg/m$^2$ and chromium oxide of 15 mg/m$^2$, thus obtaining a tin-free steel. Separately, sample films having different resin types, film thicknesses, and half crystallization times from each other were prepared.

Each of thus prepared sample films was laminated onto each metal sheet. On laminating, there were successively applied the heating by a steel roll, the heating by an induction heating roll to the sheet temperatures in a range from 30° C. above the melting point to 50° C. above the melting point, and then the pressing and cooling by lamination rolls to conduct lamination. After laminating, cooling in distilled water at 75° C. was applied. During the above steps, the heating temperature of the metal sheet was continuously varied to prepare samples having different plane orientation coefficients depending on the temperatures. By selecting adequate samples depending on the plane orientation coefficient, individual samples were obtained.

For each of thus obtained samples, the half crystallization time and the plane orientation coefficient of the resin film were determined. Also for each of the prepared samples, the corrosion resistance and the blushing resistance of film after press-forming were evaluated. Detail of each of them is described below.

[Determination of Half Crystallization Time]

Determination of half crystallization time was done by the depolarization intensity method. The depolarization intensity method is a method to determine the volume changes accompanied with crystallization by the variations in the intensity of polarization transmitted light. The half crystallization time corresponds to the time necessary for the polarization intensity to become just half the total changes. The determination was carried out using a depolarization intensity meter. The method of determination is described in the following.

A resin film which laminates or adheres to the steel sheet was mounted to a sample holder, which was then held at 30° C. above the melting point for 5 minutes. The film with the sample holder was then dropped into a bath held to 10° C. or more below the melting point, and the polarization intensity was continuously measured beginning from immediately after the dropping. The half crystallization time was derived from the changes in the polarization intensity. The measurement was continued from 10° C. or more below the melting point to 100° C. at an increment of 10° C., thereby deriving the half crystallization time at each temperature level. Among thus derived half crystallization times, the minimum value thereof was adopted as the half crystallization time.

[Determination of Plane Orientation Coefficient]

The refractive index was determined using an Abbe's refractometer with sodium D ray as the light source, methylene iodide as the intermediate liquid, and 25° C. of temperature. After determining the refractive index Nx in the longitudinal direction of film plane, the refractive index Ny in the lateral direction of film plane, and the refractive index Nz in the thickness direction of film, the plane orientation coefficient Ns was calculated using the following formula.

Plane orientation coefficient $(Ns)=(Nx+Ny)/2-Nz$

[Corrosion Resistance Test]

A sample was prepared by baking (207° C. for 10 minutes) simulating the printing step, while another sample was prepared without baking. Each of these samples was treated by press-forming using a curved surface die shown in FIG. 1(a), (0.3, 0.5, and 0.8 mm in the radius of curvature (R) for the cross section of tear-off groove, respectively), to give 50, 60, and 70 μm of the minimum sheet thickness (sole steel sheet thickness (t), also called the minimum residual thickness) at the formed portion, respectively.

The score-formed portion was immersed in an electrolyte (KCl 1% solution, normal temperature), and the current induced by applying 6.2 V between the steel sheet and the electrolyte was measured. The results are rearranged as follows to give evaluation.

Excellent: The current is 0.1 mA or smaller for all of the minimum residual thicknesses of 50, 60, and 70 μm.

Good: The current exceeds 0.1 mA for 50 μm of the minimum residual thickness, and 0.1 mA or smaller for both of the minimum residual thicknesses of 60 and 70 μm.

Fair: The current exceeds 0.1 mA for both the minimum residual thicknesses of 50 and 60 μm, and 0.1 mA or smaller for the minimum residual thickness of 70 μm.

Bad: The current exceeds 0.1 mA for all of the minimum residual thicknesses of 50, 60, and 70 μm.

In addition, the score for the minimum residual thickness of 60 μm is the thinnest level among the commercially available FOEs (full-open can lids).

[Blushing Resistance Test]

A laminated steel sheet for test was formed into a top lid shape. Immediately after filling a 350 cc steel can with 350 cc of 90° C. hot water, the prepared top lid was mounted to the can and was seamed.

Each of thus prepared cans was cooled to 70° C., 40° C., and 0° C., respectively, which was then placed in top-lid up position in a retort testing apparatus. The can was subjected to retorting under the condition of 130° C. for 30 minutes. After retorting, presence/absence of blushing was judged, and the evaluation was given in accordance with the criterion given below.

Excellent: No blushing occurred under all conditions.

Good: Blushing occurred only under the condition of filling with 0° C. water.

Fair: Blushing did not occur only under the condition of 70° C.

Bad: Blushing occurred under all conditions.

Structure and evaluation result of the resin films are listed in Table 1.

TABLE 1

| | Resin type | Terephthaloyl component in polybasic acid (mole %) | Film thickness (μm) | Half crystallization time | Plane orientation coefficient | Corrosion resistance | | | Blushing resistance |
|---|---|---|---|---|---|---|---|---|---|
| | | | | | | Die curvature | Without baking | With baking | |
| Invention example 1 | PET-1 | 96 | 20 | 3 | 0.01 | 0.3 | excellent | excellent | good |
| | | | | | | 0.5 | excellent | excellent | |
| | | | | | | 0.8 | good | good | |
| Invention example 2 | PET-1 | 96 | 27 | 3 | 0.01 | 0.3 | excellent | excellent | good |
| Invention example 3 | PET-1 | 96 | 13 | 3 | 0.01 | 0.3 | good | good | good |
| Invention example 4 | PET-1 | 94 | 20 | 4 | 0.01 | 0.3 | good | good | good |
| Invention example 5 | PET-1 | 96 | 20 | 3 | 0.04 | 0.3 | good | good | good |
| Invention example 6 | PET-PBT ① | 100 | 20 | 1 | 0.01 | 0.3 | excellent | fair | excellent |

TABLE 1-continued

| | Resin type | Terephthaloyl component in polybasic acid (mole %) | Film thickness (μm) | Half crystallization time | Plane orientation coefficient | Die curvature | Corrosion resistance Without baking | Corrosion resistance With baking | Blushing resistance |
|---|---|---|---|---|---|---|---|---|---|
| Invention example 7 | PET-PBT ② | 100 | 20 | 0.5 | 0.01 | 0.3 | excellent | fair | excellent |
| Invention example 8 | PET-1 | 99 | 20 | 2 | 0.01 | 0.3 | excellent | fair | good |
| Invention example 9 | PET-1 | 92 | 20 | 5 | 0.01 | 0.3 | fair | fair | fair |
| Invention example 10 | PBT | 100 | 20 | 0.2 | 0.01 | 0.3 | good | good | excellent |
| Comparative example 1 | PET-1 | 90 | 20 | 6 | 0.01 | 0.3 | bad | bad | bad |
| Comparative example 2 | PET-1 | 96 | 20 | 3 | 0.05 | 0.3 | bad | bad | good |
| Comparative example 3 | PP | — | 20 | | 0 | 0.3 | bad | bad | good |
| Comparative example 4 | PE | — | 20 | | 0 | 0.3 | bad | bad | good |

PET-I: Copolymer resin of terephthalic acid/isophthalic acid/ethylene glycol
PET-PBT ①: Mixed resin of polyethylene terephthalate (70 wt %) and polybutylene terephthalate (30 wt %)
PET-PBT ②: Mixed resin of polyethylene terephthalate (50 wt %) and polybutylene terephthalate (50 wt %)
PBT: Polybutylene terephthalate
PP: Polypropylene
PE: Polyethylene Invention examples 1 to 10 which satisfy the requirements of the present invention give favorable corrosion resistance. Comparison between Invention example 1 and Invention example 8 shows that, although the film thickness and the plane orientation coefficient are the same between these examples, the corrosion resistance largely differs under the condition of with baking because the molar percentage of terephthaloyl component in the polybasic acids component structuring the copolyester is in a favorable range. Invention examples give favorable blushing resistance. In particular, Invention examples 6, 7, and 10 are superior giving high crystallization rate.

Comparative examples 1 to 4 are poor in corrosion resistance because they do not satisfy the requirements of the present invention. Comparative example 1 is inferior in corrosion resistance and blushing resistance because of small half crystallization time. Comparative example 2 is inferior in corrosion resistance because of high plane orientation coefficient.

INDUSTRIAL APPLICABILITY

As described above, the easy open end which is formed by press-forming of the laminated steel sheet according to the present invention using a curved surface die gives excellent corrosion resistance even with a thin score residual thickness, thus both the can openeability and the elimination of repair lacquering are satisfied. The easy open end is applicable in wide uses including beverage cans and general food cans. Furthermore, the easy open end has excellent blushing resistance so that it is suitable for the applications requiring blushing resistance.

The invention claimed is:

1. An easy open end comprising a copolyester resin film having about 5 minutes or shorter half crystallization time and plane orientation coefficient between about 0.04 and 0.01, wherein the copolyester resin has about 94 to about 98% by mole of a terephthaloyl component, at thicknesses from about 10 to about 30 μm on at least one side of a steel sheet, the easy open end being provided with a tear-off groove having a cross sectional shape with curvatures from about 0.1 to about 1 mm.

2. The easy open end as in claim 1, wherein the copolyester resin is a polymer of ethylene glycol with terephthalic acid and isophthalic acid.

3. The easy open end as in claim 1, wherein the copolyester resin is a polymer of a polybasic acid component having about 94 to 98% by mole of terephthalic acid with ethylene glycol and butylene glycol.

* * * * *